United States Patent [19]

Szivós et al.

[11] 4,040,973

[45] Aug. 9, 1977

[54] PROCESS AND APPARATUS FOR THE CONCENTRATION AND STORAGE OF LIQUID RADIOACTIVE WASTES

[75] Inventors: Károly Szivós; Gyula Lovass; Läszlo Lipták; József Hirling; Ozskár Pavlik, all of Budapest, Hungary

[73] Assignee: Magyar Tudomanyos Akademia Izotop Intezete, Budapest, Hungary

[21] Appl. No.: 430,585

[22] Filed: Jan. 3, 1974

[51] Int. Cl.[2] .......................... C09K 3/00; C09K 11/04

[52] U.S. Cl. .......................... 252/301.1 W; 159/16 R; 159/47 R; 176/37; 202/234; 203/49; 261/79 A; 261/119 R

[58] Field of Search ................. 261/119 R, 79 A, 158; 159/16 R, 4 A, DIG. 12, 4 GC, 6 R; 203/49, 96; 252/301.1 W; 202/234; 176/37; 210/71, 175

[56] References Cited

U.S. PATENT DOCUMENTS

| | | | |
|---|---|---|---|
| 2,698,779 | 1/1955 | Adams et al. | 203/49 |
| 2,847,083 | 8/1958 | Hibshman | 159/6 R |
| 3,052,613 | 9/1962 | Wigner et al. | 176/37 |
| 3,326,778 | 6/1967 | Mock | 203/49 |
| 3,527,026 | 9/1970 | Miura | 261/79 A |
| 3,550,669 | 12/1970 | Lippert et al. | 159/6 R |
| 3,565,767 | 2/1971 | Light | 159/16 R |
| 3,567,633 | 3/1971 | Valdespino | 159/6 R |

*Primary Examiner*—Bernard Nozick

*Assistant Examiner*—Frank Sever

[57] ABSTRACT

Liquid radioactive wastes are concentrated to form a pasty radioactive concentrate by evaporation below the boiling point of the waste by injecting a hot gaseous medium tangentially in a vortex stream over the entire surface of the liquid waste, thereby entraining vapor evaporated from the liquid surface, removing the gaseous medium together with the entrained vapor, drying and reheating the removed gaseous medium and recirculating it in a vortex stream over the surface of the waste, which may then be stored in the same container in which the evaporation took place.

9 Claims, 5 Drawing Figures

PROCESS AND APPARATUS FOR THE CONCENTRATION AND STORAGE OF LIQUID RADIOACTIVE WASTES

This invention relates to a process and an apparatus for the concentration of liquid radioactive wastes at temperatures below their boiling points, and for the final storage thereof.

Several technologies have been known so far for the concentration and storage of liquid radioactive wastes coming from atomic power stations, research reactors, isotope laboratories, etc.

According to the most widely used method of concentration, the liquid wastes are concentrated in an evaporator, and these concentrates are filled into containers capable of final storage. According to other known methods the concentrate is solidified using certain additives (cement, bitumen, etc), and this solidified material is left for final storage.

In these known methods the concentration of the wastes and their storage consist of two separate technological operations, both of them running with several difficulties and disadvantages. Some of these disadvantages are listed below.

1. Concentration with an Evaporator

Due to the fact that the radioactive waste water is boiled in the still-pot of the evaporator, radioactive substances and gases, partially absorbed into the water droplets and partially dissolved in the vapor, are swept away by the vapor leaving the equipment, therefore the vapor has to be condensed and subjected to a separate purification step.

At higher salt concentration, particularly in the presence of organic substances, foaming of the waste water occurs in the evaporator, further decreasing the decontamination factor.

During the operation salt deposits containing radioactive substances are formed on the heating surface of the evaporator and on other parts of the apparatus, consequently the operation of this equipment requires difficult purification, and maintenance, which encumbers the operation and limits the evaporation degree to a great extent.

The operation of the evaporator requires steady supervision.

2a. Storage in Containers, in Liquid State

This method of storage has the disadvantage that, arising from the nature of the technology, the waste water cannot be concentrated more than the density-limit of its pumping, consequently a total volume far exceeding the effective volume of the radioactive substances and other salts or organic materials has to be stored in the containers. This requires a great increase of the volume both of the containers and of their buildings, serving also as means for biological shielding, thus causing high extra expenses.

2b. Storage with the Solidification of the Concentrate

This method has the disadvantage that it requires expensive extra technological steps, and the volume with additives to be stored further increases in comparison with that of the concentrate itself obtained by evaporation.

According to the drying-evaporating method of the French firm "Campagnie des Salines de Midi et des Salines de L'est" of the type "Aceran", the drier-evaporator is substituted for an evaporator operating at temperatures below the boiling point. This equipment operates like the water-film cooling towers; the water vapors are swept away from the waste water running down on the glass sheets by a countercurrent air stream. Due to the fact that the liquid to be evaporated is moving, the decontamination factor is rather low, and the upper limit of concentration is just as limited as in the case of the conventional evaporators.

With respect to the problems arising at the handling and storage of liquid radioactive waste materials, the most appropriate apparatus among the known ones seems to be the waste material handling apparatus of the Institute of Isotopes of the Hungarian Academy of Sciences, heated by IR radiation.

In this equipment IR radiators are built into the top of the evaporator, the radiated power is absorbed in the thin upper layer of the water, and causes it to boil. The vapors formed are removed using a ventilator. The main advantages of this apparatus are the simplicity and good decontamination factor, it has the disadvantages, however, that its energy efficiency is low, and large amounts of expensive electric energy are required for heating. In high-power and high-level activity IR evaporator equipment the heating elements cannot be replaced easily, finally, the equipment operates in open chain on the vapor side, that is, no safety isolation is applied. On the basis of the above, the IR-evaporator can be used primarily as low-power apparatus.

This invention aims at the elaboration of a process and apparatus providing more simple possibilities, compared to the conventional ones, for the concentration of radioactive waste materials at temperatures below their boiling points, and for the final storage thereof.

These aims can be fulfilled when the radioactive waste materials are concentrated at the site of their final storage, and the concentration is carried out using a transport medium of 0.5 to 1.5 atm. pressure, said medium circulating in a closed loop circuit, and transporting both heat and vapor.

According to a preferred embodiment of the invention, steam is injected in a suitable manner into this transport medium flowing in closed circuit, then it is condensed together with the vapors of the waste liquor, transported by the medium.

According to a preferred method of the invention, the transport medium is tangentially injected into the vapor site through one or more inlet air ducts, thus the transport medium approaches the surface of the liquid containing the waste material to be concentrated in a vortex stream, thereafter the exhausted medium is led along the outer mantle of the container containing the waste material. Thereafter the vapor contained in the transport medium is condensed, the medium is re-heated, and recirculated.

After the concentration step the concentrate is surrounded with a self-solidifying impermeable substance, preferably with bitumen.

The apparatus in which the above process can be carried out consists of an outer and an inner container, preferably made of a single double-walled container, in which the radioactive waste material to be concentrated is placed into the open-surface inner container, and a spiral gas-diverting channel, serving to remove the exhausted transport medium, is arranged in the space between the two containers.

According to an embodiment of the invention, a single container can be used instead of the two container system.

The invention is elucidated in the following by the aid of the attached drawings, showing some exemplary embodiments of the apparatus according to the invention.

Figure 1:
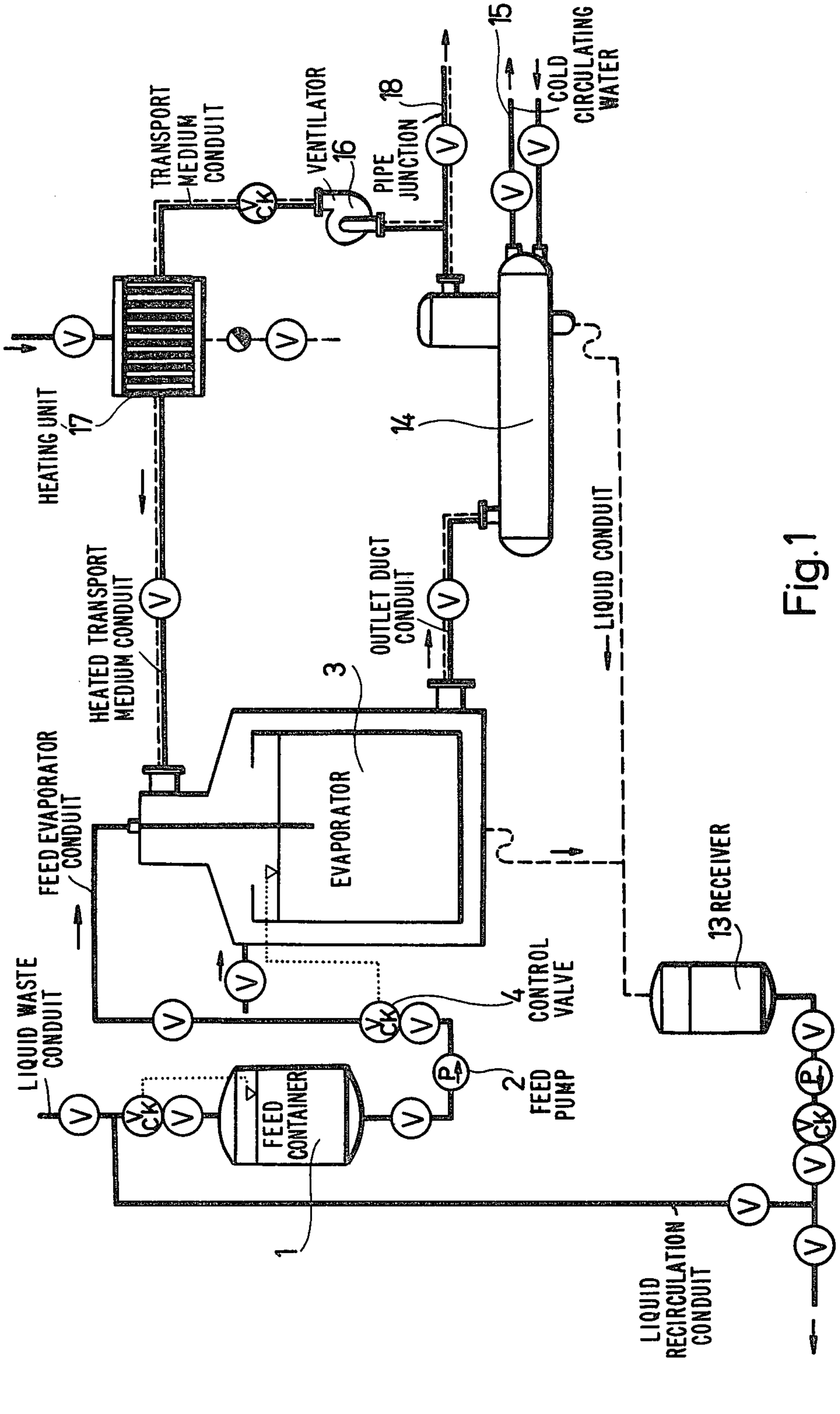
FIG. 1 is a simplified flow diagram of the operation of the apparatus according to the invention.
Figure 2:
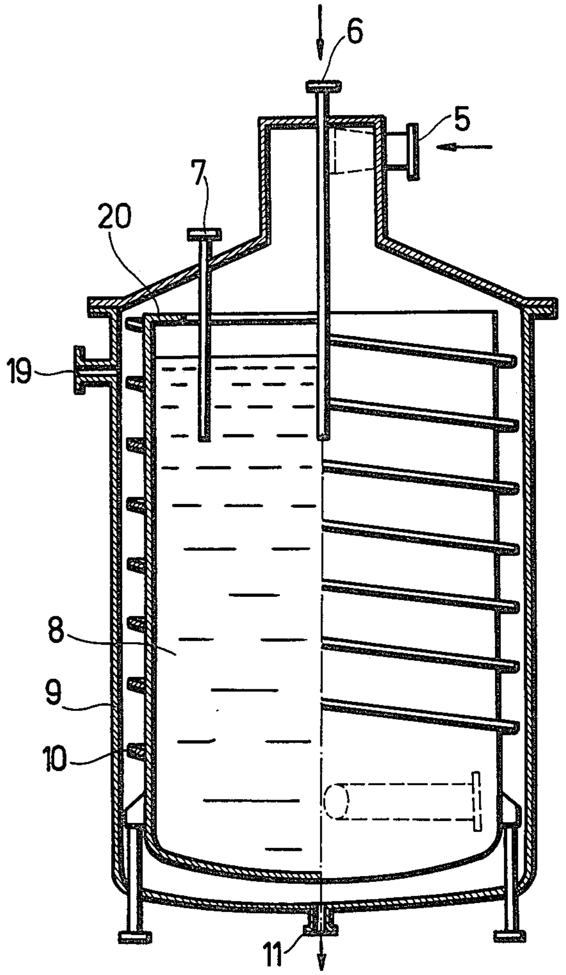
FIG. 2 is a schematic elevation view partly in section of the concentration-storage apparatus having a double container.
Figure 3:
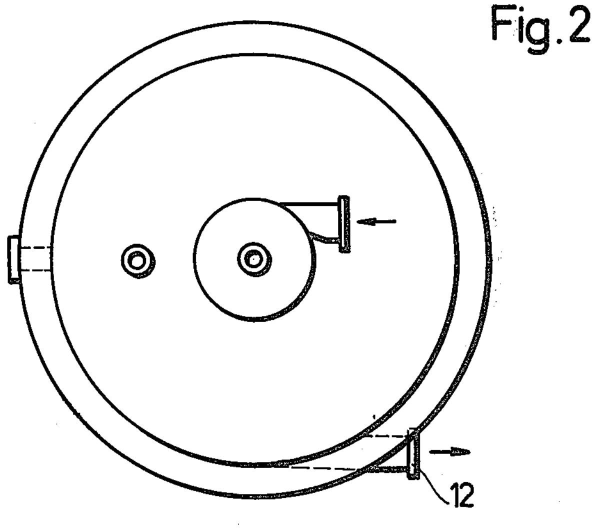
FIG. 3 is the top view of the container shown in FIG. 2.

According to the flow diagram shown in FIG. 1, the liquid wastes to be stored are introduced, after or without a preliminary treatment, into a feed container 1. The liquid wastes are introduced from the feed container 1 by a feed pump 2 into a storage-evaporation container 3. In order to ensure the maximum working capacity the liquid is to be kept at an almost constant level within the evaporator 3, therefore the transport capacity of the pump 2 is controlled by an appropriate control valve 4 operated by the liquid level of the evaporator 3. The design of the evaporator 3, as well as the processes proceeding therein are shown in FIGS. 2 and 3. The evaporator 3 is a right cylindric double-walled container made of stainless steel. An inner, open-top container 8 serves to store the wastes, while an outer, closed-top container 9 serves partially to seal and to direct the transport medium, and partly to prevent the outflow of the radioactive wastes into the surroundings when the inner container 8 gets damaged. The hot and dry transport medium is injected tangentially into the evaporator via an inlet duct 5, with a speed of 10 to 30 m./sec., depending on the nature of the medium and on the construction of the evaporator. In the upper cylindrical part of the container a vortex stream is formed, and at the same time the transport medium approaches toward the surface of the liquid. In the upper conic part of the container 9 the tangential velocity of the transport medium continuously decreases, and in the vicinity of the liquid surface this velocity does not exceed some m./sec. The downward velocity component of the vortex can be better regulated if a part of the medium is injected coaxially downwards. The waste water is supplied coaxially below the liquid surface, via a water-inlet duct 6.

A duct 7 serves as an outlet for the water-level gauge. Since the liquid in the evaporator contains salts, acids and bases, and has a relatively high conductivity, an electric level gauge can be used as water level gauge with great advantages, in which one of the poles of the electrical source is connected to a plurality of electrodes, having different lengths, connected parallel with each other, while the other pole of said source is connected to the inner container 8. A relay is connected to the circuits of the respective electrodes. When the end of one of the electrodes reaches the level of the liquid, the current intensity increases in the respective circuit, and the relay closes, thus giving a control signal.

The dry hot transport gas, approaching the water surface in a vortex stream, gets saturated with water vapor. The temperature of the waste water is below its boiling point, therefore the evaporation occurs only from the surface of the liquid. This ensures a very great decontamination factor. Contrary to the conventional evaporators, a normal substance stream intersecting the surface of the liquid does not occur, therefore the unwanted foaming the droplet-escape cannot be observed. Due to the fact that evaporation occurs at a temperature below the boiling point, only a minor amount of the active gases dissolved in the waste liquor, appear in the transport medium. The evaporation rate is determined by the intensity of the so-called wet heat-exchange, which depends on the diffusion coefficient, on the pressure and velocity of the transport medium, further on the difference between the partial pressures of water vapor measured above the water surface and in the transport medium. Most conveniently air is used as transport medium, but in some applications the use of other gases is more preferred. If nitrogen is used as transport medium, the risk of corrosion is decreased in the system. If helium gas is used, the corrosion problems can be avoided, and the specific output of the system can be increased, too.

The transport medium of increased vapor content enters a tangential vortex stream from the evaporation space into the heating space, which is located between the inner container 8 and the outer container 9. A security droplet trap is to be mounted into the path of the transport medium entering the heating space. The most simple droplet trap is illustrated in FIG. 2, which is formed by a rim 20 of the inner container 8.

The transport medium is directed in the heating zone by a gas-diverting signal 10. When streaming in the heating zone, the major part of the heat of the transport gas is transferred to the container 8, thus compensating for the heat losses due to the evaporation of the waste water in said container.

During this process the waste water is practically in a respose state in the inner container 8, therefore the mechanical contaminants of the waste material settle on the bottom of the container, moreover, as a consequence of the temperature dependence of the specific gravity of the water, the temperature of the water is lower at the bottom of the container than at its top, and this promotes the precipitation of the dissolved salts at the bottom of the container. A further consequence of the formed temperature gradient is, that the temperature of the transport gas may be lower at the bottom of the heating zone than the temperature of the liquid at the surface level, thus the condensation of the water vapor content of the transport medium may begin already in the lower part of the heating zone, furthermore the heat liberated during the condensation process is transferred into the inner container 8, thus improving the thermal efficiency of the system. The liquid condensed in the heating zone is forwarded into a receiver 13 through an outlet duct 11 and a syphon.

If the output of the apparatus is limited by the decrease of the heat transferable through the walls of the inner container (thus, for example, if the container walls get contaminated), the intensity of heating can be increased by introducing a proper amount of steam into the space between the two containers through an inlet duct 19. The condensate of the steam introduced leaves the system together with the condensate of the vapors removed from the evaporating zone.

The transport medium leaves the system through an outlet duct 12, and is fed into a condenser 14. The condenser 14 can be made by a vertically or horizontally arranged tubular heat-exchanger. In the tubes of the condenser 14 cold cooling water 15 is circulated, while the transport medium is circulated between the tubes. The major part of the heat stream directed to the cooling surfaces comes from the heat liberated in the condensation process of the water vapors contained in the transport medium, while its minor part originates from the self-cooling of the transport medium. The temperature drop of the transport medium leaving the condenser 14 is relatively low, while its relative humidity becomes far less than 100 per cent. The absolute humidity of the transport medium is about the same as the saturation humidity belonging to the temperature of the cooling water leaving the system. The liquid separated in the condenser 14 and at the bottom of the outer container 9 is collected in the receiver 13. It is preferable to supervise continuously the radioactivity of the liquid in said receiver. After a proper radioactivity control, the liquid can be recirculated.

Thereafter the transport medium is supplied into a heating unit 17 by means of a ventilator 16. The heating unit 17 consists of a conventional calorifer heated with steam or hot water, from which the heated transport medium is recirculated into the evaporator container 3.

In the apparatus according to the invention the transport medium circulates in a closed loop. If air is used as transport medium, the system can equally be operated with a pressure lower or higher than atmospheric, but if other gases are used as transport medium, only overpressure can be applied. If the transport medium is air, the depression is caused by a pipe-junction 18 connected to the ventilation system of the liquid waste treating apparatus, while if overpressure is to be maintained, this can be made by introducing gas into the system through the junction 18, said gas serving simultaneously for supplementing the gas losses occurring in the system. Due to the fact that the system is completely closed, the leakage of the gas can be maintained on the minimum. The radioactivity of the transport medium is low, thus the accidentally escaped gases are exhausted by the ventilation system of the liquid waste treating apparatus. The characteristic operative parameters of the transport medium in the system according to the invention may be adjusted to the following values:

| transport medium (air or nitrogen) | |
|---|---|
| temperature at the inlet point of the evaporator | 80 to 160° C |
| temperature at the inlet point of the condenser | 40 to 90° C |
| temperature at the outlet point of the condenser | 30 to 80° C |
| specific flow-rate related to the water surface | 200 to 400 $m^3/m^2$.h. |
| temperature of the waste water in the inner container | 50 to 90° C. |

The evaporation rate (related to the water surface) varies to a great extent depending on the nature of the transport medium and on the actual values of the operative parameters. The approximate value of the evaporation rate may vary between 2 to 15 kp/$m^2$. h. Also, the decontamination factor depends on a plurality of parameters; its approximate value may vary between $10^5$ to $10^6$ (without purification of the vapor).

The location of the apparatus according to the invention depends to a great extent on the specific radioactivity and on the composition of the waste water to be treated. In most of the cases only the evaporator, and optionally the feed container is to be provided with means for biological shielding. If the pasty concentrate fills the store, the outer connections are closed.

Following the concentration process, the space between the two containers is preferably filled in with a self-solidifying impermeable material, e.g. with dilute cement mortar or with hot liquid bitumen. The space between the outer walls of the container and the walls of the surrounding building an equally be filled with similar materials.

The self-solidifying material (filler) is introduced into and/or around the container via previously built-in tubes. After the solidifying of the filler the container, now out of use, does not require any further handling or supervision, and retains its hermetic sealing for a long period of time. With small units the filled storage container can be transported, too.

Figure 4:
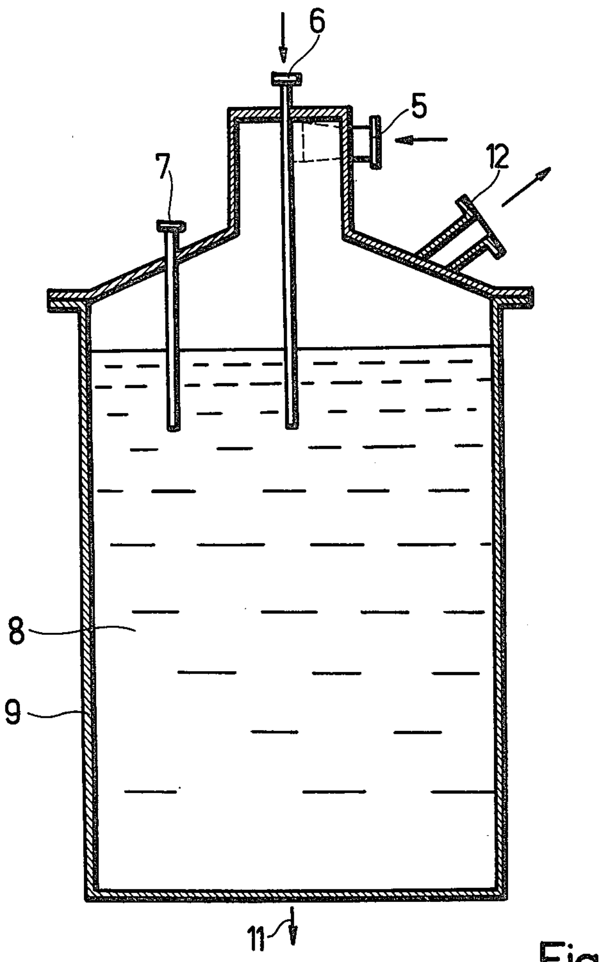
FIG. 4 is a schematic elevation view partly in section of the concentration-storage apparatus having a single container.
Figure 5:
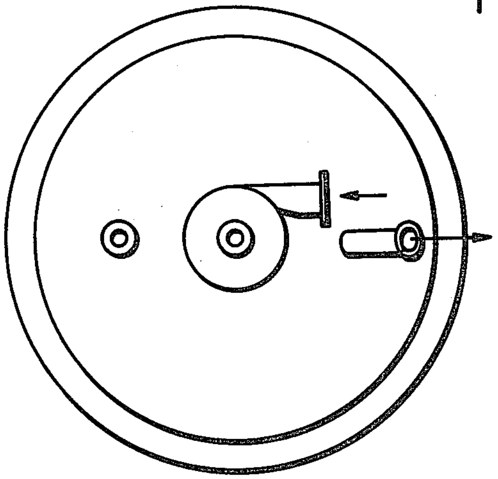
FIG. 5 is the top view of the container shown in FIG. 4.

If the waste water, which leaves the power stations etc., is of high salt content, on if the obtained waste water is pre-concentrated with a conventional evaporator, the apparatus according to the invention can be constructed with a lower specific surface output, having simpler design and lower costs. This simplification is ensured by the fact that in this case the double-walled container can be replaced by a single-walled container. This single-walled container has essentially the same construction as the outer container of the apparatus shown in FIG. 2. The single-walled container is shown in FIGS. 4 and 5. The only difference between this single-walled container and the double-walled container are that the outlet duct 12 of the transport medium is arranged on the conic upper surface of the container cap, and the outlet duct 11, serving to remove the condensate from the outer container, is omitted. The support of the container can be designed as it is usual for upright cylindrical containers.

In this equipment the heat-transfer corresponding to the evaporation heat occurs on the liquid surface, and, obviously, no heat-transfer occurs through the sidewall of the container.

In this equipment the transport medium, transporting both the heat and the vapors, is directed via the tangential inlet duct 5 in a vortex stream to proceed towards the liquid surface, and the transport medium is removed via the outlet duct 12 located on the conic upper surface of the container.

The specific output capacity of this equipment, related to the liquid surface, is 1 to 2 kg/$m^2$. h if the transport medium has the above-defined parameters.

The outer equipments surrounding the apparatus in question can remain unchanged, but the condenser 14 can be inserted into the loop circuit in partial flow, as well.

In this equipment, due to the lower specific output capacity and the lower requirements of heating, sometimes the heating unit 17 can be operated by electric energy.

The security of the final storage after the filling and evaporation steps can be increased by introducing a self-solidifying impermeable substance (e.g. hot liquid bitumen or alkaline cement mortar) between the outer wall of the container and the building (preferably a concrete cell) surrounding the same. The common advantage of all embodiments of the apparatus according to the invention is, that no moving element or element requiring further handling is located in the space provided with means for biological shielding. The handling of the apparatus is more simple and more safe than that of the known ones, since the concentration occurs at the place of the final storage, and by this concentration a very effective decontamination factor can be ensured.

Depending on the composition of the starting liquid wastes, the liquid wastes can be evaporated using the apparatus of the invention so as to reach a solid content of 500 to 1000 g./l., thus the necessary storage volume, related to the volume of the starting liquid wastes, is far lower than in the case of other known apparatuses (with the exception of the IR-heated evaporator, where a similar concentration rate can be achieved). The apparatus of the invention can be operated economically while it can be heated using non-expensive fuels (steam, hot water, etc.)

What we claim is:

1. An apparatus for evaporation of liquid components from a liquid radioactive waste and storage of the resulting pasty radioactive concentrate comprising a substantially cylindrical inner container having an open top for receiving said liquid radioactive waste, tangential inlet means located above the surface of the liquid radioactive waste within said inner container and adapted to inject a hot gaseous medium in a vortex stream into the entire vapor zone located above said liquid surface, a closed outer container arranged about said inner container, outlet means located at the lower part of said outer container for removing said gaseous medium carrying vapor from said vapor zone, a gas diverting spiral arranged in the space defined between said outer and said inner containers for directing said gaseous medium from said vapor zone along the outer surface of said inner container towards said outlet means, thereby transferring heat from said gaseous medium to said radioactive waste within said inner container, and a closed loop gas circulating system communicating said inlet and said outlet means during evaporation, said system being adapted to remove vapor from and subsequently apply heat to said gaseous medium.

2. The apparatus of claim 1 after concentration comprising cement mortar in the space between the walls of said outer and said inner containers.

3. The apparatus of claim 1 after concentration comprising in the space between the walls of said outer and said inner containers.

4. The apparatus of claim 1, wherein said outer container comprises a steam introducing means extending into the upper part of said space defined between said outer and inner containers.

5. The apparatus of claim 1, wherein after concentration, a bitumen substance is located in the space between the walls of said outer and inner containers.

6. The apparatus of claim 1, wherein said outer and inner containers comprise a single double-walled container.

7. The apparatus of claim 1 comprising said tangential inlet means disposed at the upper part of said outer container and said upper part of said outer container flaring downwardly substantially between said inlet means and said liquid surface serving to decrease the velocity of said injected gaseous medium when approaching said liquid surface in said vortex stream.

8. A process for the concentration of a liquid radioactive waste to form a pasty radioactive concentrate by evaporation below the boiling point of said waste in a structure comprising an inner container for said liquid, a closed outer container surrounding said inner container and a gas diverting spiral arranged in the space defined between said outer and said inner containers, said process comprising the steps of injecting a hot gaseous medium tangentially in a vortex stream over the entire surface of said liquid radioactive waste, thereby entraining vapor evaporated from said liquid surface, removing said gaseous medium together with entrained vapor by means of said gas diverting spiral thereby transferring heat indirectly from said gaseous medium to the bulk of said liquid whereby evaporation heat losses are partly compensated, drying and reheating said gaseous medium, and recirculating said gaseous medium in a vortex stream over the entire surface of said liquid radioactive waste.

9. The process of claim 8 wherein steam is added to said gaseous medium after contact with said liquid surface to improve said heat transfer between said gaseous medium and the bulk of said liquid waste.

* * * * *